(12) United States Patent
Koble

(10) Patent No.: US 8,603,331 B1
(45) Date of Patent: Dec. 10, 2013

(54) SWIMMING POOL CHLORINATION APPARATUS

(76) Inventor: Danny L. Koble, Phoenix, AZ (US)

(*) Notice: Subject to any disclaimer, the term of this patent is extended or adjusted under 35 U.S.C. 154(b) by 508 days.

(21) Appl. No.: 12/803,935

(22) Filed: Jul. 9, 2010

(51) Int. Cl.
  *C02F 1/467* (2006.01)
  *C02F 1/76* (2006.01)
(52) U.S. Cl.
  USPC .................... 210/167.11; 210/232; 204/194
(58) Field of Classification Search
  USPC .......... 210/167.11, 198.1, 232; 204/742, 194
  See application file for complete search history.

(56) References Cited

U.S. PATENT DOCUMENTS

| | | | |
|---|---|---|---|
| 4,204,961 A * | 5/1980 | Cusato, Jr. ............... | 210/232 |
| 4,714,534 A * | 12/1987 | Fair et al. ................ | 204/269 |
| 5,531,865 A * | 7/1996 | Cole ........................ | 205/751 |
| 6,096,207 A * | 8/2000 | Hoffman et al. .......... | 210/232 |
| 6,942,766 B2 * | 9/2005 | Lemke ...................... | 204/242 |
| 2006/0113256 A1 * | 6/2006 | Birkbeck .................. | 210/748 |
| 2008/0093225 A1 * | 4/2008 | Cline et al. .............. | 205/687 |

* cited by examiner

*Primary Examiner* — Fred Prince
(74) *Attorney, Agent, or Firm* — H. Gordon Shields

(57) ABSTRACT

A tee shaped housing for a swimming pool chlorinator apparatus has three ports, a water inflow port, a water outflow port, and a port into which an electrode assembly unit is sealingly disposed. The electrode assembly includes a plurality of alternating anode and cathode plates which extend into the flow of water in the housing, and the plurality of plates is connected to a source of electrical current. When the electrode assembly is removed for cleaning, a dummy plug is inserted into the port to seal the port so that the flow of water through the housing may continue while the plates are being cleaned.

14 Claims, 2 Drawing Sheets

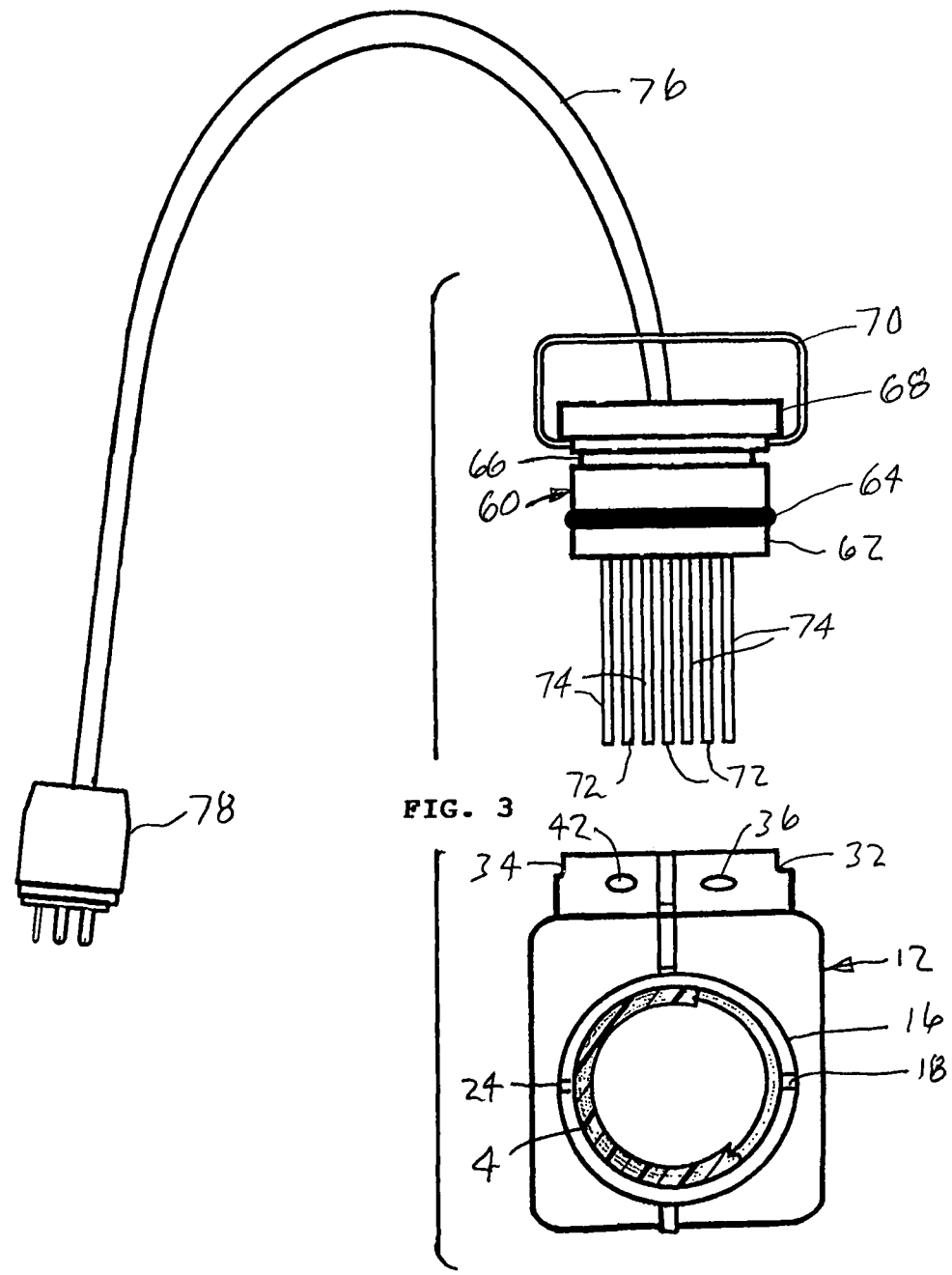

SWIMMING POOL CHLORINATION APPARATUS

CROSS REFERENCE TO RELATED APPLICATIONS

Not applicable

STATEMENT REGARDING FEDERALLY SPONSORED RESEARCH OR DEVELOPMENT

Not Applicable

BACKGROUND OF THE INVENTION

1. Field of the Invention

This invention pertains to swimming pools, and, more particularly, to a cell for chlorinating swimming pools.

2. Description of the Prior Art

Prior art swimming pool chlorinating cells are in line units. That is, they are inserted into a water recirculating line between a pump and the pool. For cleaning, the unit is removed from the line and the line is either shut down while the cleaning takes place or else another length of pipe is placed in the line in place of the removed unit.

The present chlorination cell apparatus includes a tee housing with an electrode assembly inserted into a port of the tee housing. The electrode assembly is removable for cleaning and a plug is inserted into the housing in place of the electrode assembly so that water may continue to flow during the cleaning period.

SUMMARY OF THE INVENTION

The invention described and claimed herein comprises a tee housing placed in a swimming pool recirculating water line, with two elements of the tee in line with the water line and an electrode assembly inserted into the third element. For cleaning, the electrode assembly cell is removed and a plug inserted into the tee in place of the removed electrode assembly. There is no lost time regarding the recirculating water, and the ease of installing the assembly greatly simplifies the chlorination process of a swimming pool.

Among the objects of the present invention are the following:

To provide a new and useful chlorination cell for swimming pools;

To provide a new and useful chlorination cell including a tee housing having three port elements and an electrode assembly insertable into one of the ports;

To provide a new and useful chlorination apparatus having an electrode assembly selectively insertable into one of two ports of a tee housing; and To provide a new and useful chlorination apparatus having a plug replacing an electrode assembly in a tee housing in a water line when the electrode assembly is removed for cleaning.

BRIEF DESCRIPTION OF THE SEVERAL VIEWS OF THE DRAWING

FIG. 3 is an exploded view of the present invention taken generally along line 3-3 of FIG. 2.

DETAILED DESCRIPTION OF THE INVENTION

Figure 1:
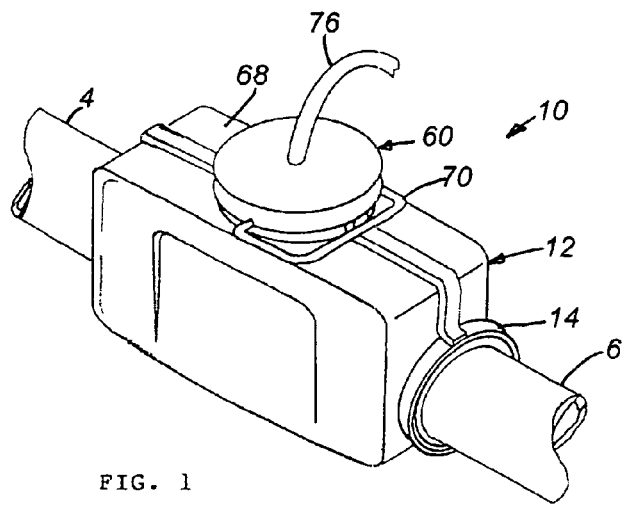
FIG. 1 is an upper left perspective view of the apparatus of the present invention in its use environment.
Figure 2:
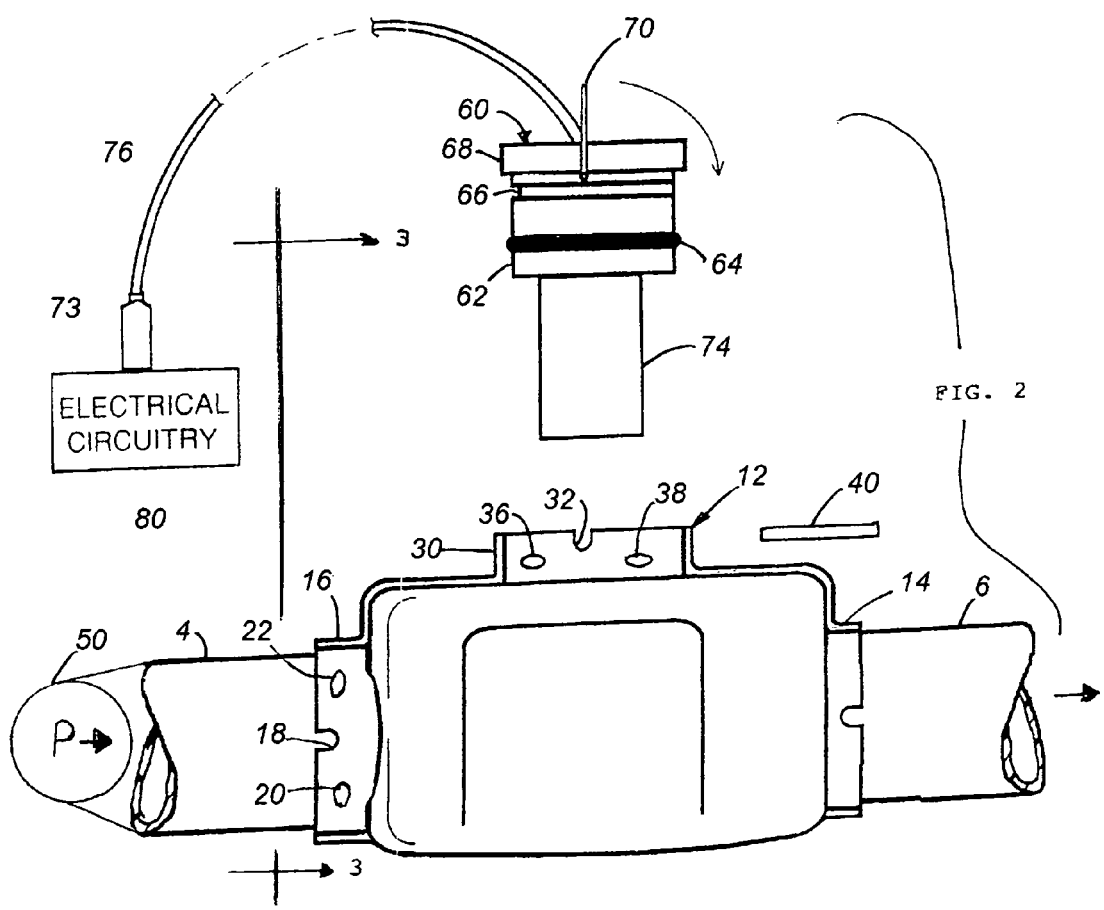
FIG. 2 is an exploded view of the apparatus of FIG. 1.

FIG. 1 is a left perspective view of a swimming pool chlorinating apparatus 10 of the present invention in its use environment. FIG. 2 is an exploded side elevational view of the apparatus 10 of FIG. 1. FIG. 3 is an exploded end view of the apparatus 10 taken generally along line 3-3 of FIG. 2. For the following discussion, reference may be made to all three of the drawing figures.

The apparatus 10 includes a housing 12 with three ports, ports 14, 16, and 30. Two of the ports, ports 14 and 16, are aligned with each other, and the third port, port 30, is disposed generally perpendicular to the ports 14 and 16. As illustrated, ports 14 and 16 are connected to conduits or pipes 4 and 6, respectively. Water flow from a pump 50 to a swimming pool (also not shown) flows through the pipe 4, through the housing 12, and exits the housing 12 in pipe 6. An electrode assembly 60 is disposed in the port 30.

As best shown in FIG. 2, the port 16 includes an outer flange that is longer than the outer flange of the port 14. The outer flange of the port 30 is substantially the same length as that of the port 16.

The port 16 includes two index notches, of which an index notch 18 is shown in FIG. 2. The index notches are diametrically opposed or aligned. The port 30 also includes a pair of diametrically aligned index notches 32 and 34, as shown in FIG. 3.

There are also a pair of lock pin apertures or openings 20 and 22 shown in FIG. 2 on the port 16. Another pair of lock pin openings 36 and 38 extend through the flange of the port 30. In FIG. 3 are shown the two lock pin openings 36 and 38. The lock pin openings are on a chord in their respective ports 16 and 30.

The pairs of lock pin openings are disposed on opposite sides of the ports 16 and 30. In FIG. 2 are shown the pair of lock pin openings 36 and 38 for the port 30. Another pair of lock pin openings 20 and 22 are shown for the port 16. In FIG. 3 are shown lock pin opening 36 and a lock pin opening 42. The opening 36 is paired with the opening 38, and the opening 42 is paired with another opening, not shown.

The electrode assembly 60 includes a cylindrical barrel or boss 62. Extending about the barrel or boss 62 are two circumferentially extending grooves, a lower groove for receiving a sealing o-ring 64 and an upper groove 66. The upper groove 66 is disposed adjacent to a cylindrical top 68. The diameter of the top 68 is greater than the diameter of the barrel or boss 62. The purpose of the groove 66 will be explained below.

A pivoting wire handle 70 is used to index the electrode assembly 60 in the port 30. The handle 70 has a generally rectangular configuration, with two relatively short portions extending outwardly from the upper portion of the barrel 62 that extends into the index notches 32 and 34 to properly align the electrode assembly 60 relative to the housing 12 and to the flow of water through the housing of the apparatus 10.

The handle 70 is also used to insert the electrode assembly 60 into a port, either the port 30, or the port 16, as desired. The handle 70 is also used to remove the plug 60 from its port.

Thus, as may be understood, the electrode assembly 60 may be located in the housing 12 as either an inline unit or as an elbow, as desired. The apparatus 10 is shown as an inline unit, with the electrode assembly 60 in the port 30. However, if desired, the apparatus 10 may also be used as an elbow by inserting the electrode assembly 60 into the port 16. In the latter configuration, the pipe or conduit 4 would be secured to the port 30.

As best shown in FIG. 3, extending downwardly from the barrel 62 are seven plates, three anode plates 72 and four cathode plates 74. The anode and cathode plates 72 and 74, respectively, are interleaved. The plates are electrically connected to electrical circuitry 80 by a cable 76 and a plug 78. The electrical circuitry 80 includes a transformer which transforms line voltage down to about twelve volts and rectifies the alternating line current to direct current for use with the interleaved plates 72, 74.

The electrode assembly 60 and the plates 72, 74, are dimensioned to provide maximum plate area relative to the flow of water through the housing 12.

When the electrode assembly 60 is inserted into its port, the lock pin apertures 36, 38, and 42 (and its aligned aperture, not shown) are disposed in alignment with the upper groove 66. A lock pin 40 is shown in FIG. 2 generally parallel to and spaced apart from the lock pin apertures 36 and 38 of the port 30.

With the electrode assembly appropriately aligned by portions of the handle 70 extending into the diametrically aligned notches 32 and 34, the lock pin apertures 36 and 38 are aligned with the groove 66. The lock pin 40 may then be inserted through the apertures 36 and 38, as may be understood from FIG. 2, and another lock pin 40 (not shown) may be inserted through the second pair of lock apertures, of which only the aperture 42 is shown in FIG. 3. The pair of lock pins 40 then lock the electrode assembly 60 in its port 30 against the force of the flow of water through the apparatus 10.

When it is desired to remove the electrode assembly 60 for cleaning, a dummy plug may be inserted into the port from which the electrode assembly 60 is removed so that water flow may continue while the plates 72, 74 are being cleaned. The dummy plug is essentially like the electrode assembly 60 except that there will be no plates 72, 74 and no electrical cable 76.

The dummy plug will include the barrel 62 with an o-ring seal and a groove 66 for receiving lock pins to secure the dummy plug in its port. The dummy plug also includes a handle 70 for handling the plug. The handle 70 is used especially for removing the dummy plug from its port on the housing 12. The o-ring 64, on both the electrode assembly 60 and the dummy plug, provides a substantial amount of friction in both insertion and removal, and hence the handle 70 is a convenient element for the chlorinator apparatus 10 for the dummy plug as well as the assembly 60.

Alignment is not required for the dummy plug. There are no plates to be aligned relative to the water flow through the housing 12, and the lock pins are inserted into the lock pin apertures to secure the dummy in a port against the force of the water flow. However, the handle 70 is required for extracting the dummy plug from its port after the plates of the electrode assembly 60 have been cleaned and it is desired to insert the electrode assembly 60 back into its port.

While the principles of the above described apparatus have been made clear in illustrative embodiments, without departing from those principles there may occur to those skilled in the art modifications of structure, arrangement, proportions, the elements, materials, and components used in the practice of the apparatus, and otherwise, which are particularly adapted to specific environments and operative requirements. The appended claims are intended to cover and embrace any and all such modifications within the limits only of the true spirit and scope of the present disclosure.

What I claim is:

1. Chlorination apparatus comprising in combination:
   a housing having a tee shape for receiving a flow of water through the housing, the housing having three ports, including
   a first port for incoming water flow into the housing,
   a second port for outgoing water flow from the housing, and
   a third port for receiving an electrode assembly;
   an electrode assembly including
   a cylindrical boss extending into the third port,
   a plurality of interleaved anode and cathode plates extending downwardly from the cylindrical boss and into the flow of water through the housing, and
   means for connecting the plurality of interleaved anode and cathode plates to a source of electrical current; and
   means for orienting the electrode assembly in the housing for aligning the plurality of interleaved anode and cathode plates generally parallel to the flow of water through the housing, a including a recess on the third port and an alignment element on the electrode assembly extending into the recess for orienting the electrode assembly and its plurality of interleaved plates relative to the flow of water through the housing.

2. The apparatus of claim 1 which further includes a wire handle secured to the electrode assembly for removing the electrode assembly from the housing, and the alignment element on the electrode assembly is part of the wire handle.

3. The apparatus of claim 1 which further includes at least a pair of aligned apertures extending through the third port, and the electrode assembly unit includes a recess aligned with the pair of aligned apertures, and a pin extending into and through the aligned apertures and in the recess on the electrode assembly to secure the electrode assembly to the third port.

4. The apparatus of claim 1 which further includes a circumferential groove on the electrode assembly and an o-ring in the circumferential groove for sealing the electrode assembly in the third port.

5. The apparatus of claim 1 which further includes a plug extending into the third port when the electrode assembly is removed from the housing for sealing the third port and the flow of water through the housing.

6. The apparatus of claim 1 in which the electrode assembly is removable for cleaning the anode and cathode plates, and further includes a plug extendable into the third port for sealing the housing when the electrode assembly is removed for cleaning to allow for the flow of water through the housing.

7. The apparatus of claim 1 in which the electrode assembly is selectively inserted into the first port, and the third port becomes a port for the incoming water flow for the housing, and the first port includes a second recess for receiving the alignment element of the electrode assembly.

8. The apparatus of claim 7 in which the first and second ports are aligned with each other and the third port is generally perpendicular to the first and second ports to provide an elbow.

9. Chlorination apparatus for a swimming pool having a pump for providing a flow of water and a conduit extending from the pump to the swimming pool comprising in combination:
   a housing having a tee shape inserted into the conduit between the pump and the swimming pool for receiving a flow of water from the pump, including
   a first port on the housing, a second port on the housing,
a third port on the housing, and
a first recess on the first port and a second recess on the second port;
an electrode assembly including
a cylindrical boss,
a plurality of interleaved anode and cathode plates extending downwardly from the cylindrical boss and into the flow of water through the housing;
means for connecting the plurality of interleaved anode and cathode plates to a source of electrical current; and
means for aligning the electrode assembly selectively in the first port or in the second port, including an alignment element extending into the recess on the selected first or second port, whereby the third port becomes an outflow port for the flow of water out of the housing and into the swimming pool, and the first port receives the flow of water from the pump when the electrode assembly is inserted into the second port, and the second port receives the flow of water when the electrode assembly is inserted into the first port.

10. The apparatus of claim 9 in which the first port is generally perpendicular to the second and third ports.

11. The apparatus of claim 10 in which the electrode assembly is inserted into the first port and the plurality of interleaved plates extends into the flow of water between the second and third ports, and the means for aligning the electrode assembly extends into the recess on the first port.

12. The apparatus of claim 10 in which the electrode assembly is inserted into the second port, and the first port receives the flow of water into the tee housing from the pump, and the water flows out of the housing through the third port, and the means for aligning the electrode assembly extends into the recess on the second port, and the housing comprises an elbow with respect to the flow of water through the housing.

13. The apparatus of claim 9 in which the electrode assembly includes a pivoting handle for aiding the removal of the electrode assembly from the housing and a portion of the pivoting handle comprises the means for aligning the interleaved electrode plates relative to the flow of water through the housing by extending into a recess on one of the first or second ports.

14. The apparatus of claim 13 in which the first and second ports each include a pair of diametrically disposed recesses for receiving portions of the pivoting handle for aligning the electrode assembly relative to the flow of water through the housing.

* * * * *